UNITED STATES PATENT OFFICE 2,309,129

AZO COMPOUNDS AND PROCESS FOR COLORING

James G. McNally and Joseph B. Dickey, Rochester, N. Y., assignors to Eastman Kodak Company, Rochester, N. Y., a corporation of New Jersey No Drawing. Application June 2, 1939, Serial No. 277,085

7 Claims. (Cl. 8—50)

This invention relates to new aryl azo dye compounds and their application to the art of dyeing or coloring.

We have found that valuable azo dye compounds can be prepared by diazotizing a 2,4-dinitro-6-halogen aniline and coupling the diazonium compound obtained with mono-γ-hydroxypropyl cresidine.

The azo dye compounds of our invention have the general formula:

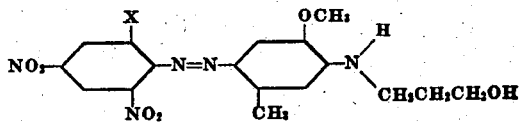

wherein X represents a halogen atom. The halogen atom represented by X may be chlorine, bromine, fluorine, or iodine.

The azo dye compounds of our invention have been found to be of particular value for the dyeing of organic derivatives of cellulose and especially cellulose acetate silk. By means of the azo dye compounds of our invention, organic derivatives of cellulose and more particularly textile materials made of cellulose acetate silk can be dyed or colored purple shades of excellent fastness to light and washing. As is well known in the art, it has been very difficult to secure azo dyes which satisfactorily color cellulose acetate silk purple shades of good light fastness. A number of dyes are available which dye cellulose acetate silk purple shades of good light fastness when present in the fiber in concentrations ranging between 1.5–3% by weight. However, these dyes when present in concentrations of 1% or less have proved too unstable to light for commercial use. The dye compounds of our invention do not have this fault and consequently possess the unusual quality of yielding shades of excellent fastness to light and washing with the employment of but small concentrations of the dye. This was not to be predicted.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While the dye compounds of our invention will be described more particularly with reference to their application for the dyeing or coloring of cellulose acetate silk, it will be understood that they can be employed for the dyeing of organic derivatives of cellulose generally such as those just named.

The following examples illustrate the preparation of the azo dye compounds of our invention:

EXAMPLE 1

A. 7.6 grams of sodium nitrite are dissolved in 53 cc. of concentrated sulfuric acid (sp. gr. 1.84) and after the addition the solution is warmed to 70° C. and then cooled to 10–15° C.

B. 21.8 grams of 2,4-dinitro-6-chloroaniline are dissolved in 250 cc. of hot glacial acetic acid and the resulting solution is then cooled rapidly to room temperature with vigorous stirring.

The solution prepared in B. is added to the solution prepared in A. over a period of 30–45 minutes while stirring and maintaining a temperature of 10–15° C. The resulting solution is stirred for an hour or more after which one gram of urea is added to remove any excess nitrous acid.

19.4 grams of mono-γ-hydroxypropyl cresidine are dissolved in 200 cc. of water containing 15 cc. of 36% hydrochloric acid. The resulting solution is cooled to a temperature approximating 0–5° C. by the addition of ice, for example, and the diazo solution prepared as described above is slowly added with stirring while maintaining a temperature of 0–5° C. After the addition of the diazo solution, the mixture is permitted to stand for a short time and is then made neutral to Congo red paper by the addition of sodium acetate. The dye compound formed is recovered by filtration, washed with water and dried. The dye compound obtained has the formula:

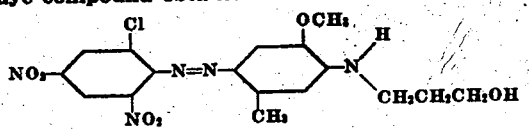

and color cellulose acetate silk a purple shade.

EXAMPLE 2

24.2 grams of 2,4-dinitro-6-bromoaniline are diazotized and the diazonium compound obtained is coupled with 19.4 grams of mono-γ-hydroxypropyl cresidine. The diazotization, coupling and recovery of the dye compound may be carried out in accordance with the procedure described in Example 1. The dye compound obtained has the formula:

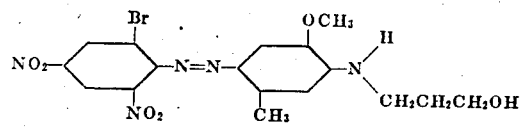

and colors cellulose acetate silk a purple shade. 2,4-dinitro-6-iodoaniline and 2,4-dinitro-6-fluoroaniline may be substituted for the 2,4-dinitro-6-bromoaniline of the example to obtain dye compounds which similarly color cellulose acetate silk purple shades.

Mono-γ-hydroxypropyl cresidine can be prepared by treatment of cresidine with trimethylenechlorohydrin in the presence of an alkali such as sodium bicarbonate or sodium carbonate. Preferably a slight excess of trimethylene chlorhydrin over that theoretically required is employed.

Further details concerning the preparation of γ-hydroxy-propyl cresidine will be apparent from the following examples:

EXAMPLE A.—γ-*Hydroxypropyl cresidine*

137 grams of cresidine, 60 grams of sodium carbonate and 85 grams of trimethylene chlorohydrin are heated under reflux for 4 hours. The salt is separated by means of benzene and the reaction product fractionated under reduced pressure. There is obtained a good yield of γ-hydroxypropyl cresidine boiling at 199–204°/16 mm.

While, as indicated above, we prefer to employ the mono-substitution product, our method of preparing the mono-substitution product may also be applied to the preparation of other hydroxyalkyl derivatives of cresidine, as will be apparent from the following example:

EXAMPLE B.—*Di-γ-hydroxypropyl cresidine*

137 grams of cresidine are placed in 1000 cc. of 10% sodium hydroxide heated to boiling and 210 grams of trimethylene chlorohydrin are added dropwise with stirring over a period of four hours. Refluxing is continued for 1 hour after the addition of the last of the chlorohydrin. The reaction product is removed from the water with benzene and fractionated under reduced pressure. There is obtained a good yield of di-γ-hydroxypropyl cresidine boiling at 225–230°/4 mm.

As indicated, these compounds may be prepared by reacting various cresidine compounds with suitable alkyl halohydrins such as ethylene chlorohydrin, propylene bromohydrin, trimethylene chlorohydrin, glyceryl chlorohydrin, tetramethylene chlorohydrin, or with the various oxides such as ethylene oxide, propylene oxide, etc.

While the reactions described in Examples A and B are shown as being carried out in the presence of an alkali such as sodium carbonate or sodium hydroxide, they can be carried out, for example, in the presence of an alkali such as potassium carbonate, potassium hydroxide and calcium hydroxide.

We have also found that the hydroxyalkyl derivatives of cresidine may be prepared by reacting cresidine with aldehydes containing hydroxy groups in the side chain such as glycol aldehyde, glyceryl aldehyde, glucose, arabanose, etc., and reducing the product with hydrogen in a suitable catalyst such as nickel, copper, chromate, or the chemically produced agents such as formic acid, sodium alcoholate, etc.

Some other derivatives which we have found may be prepared by procedure as described are as follows:

Ethyl glyceryl cresidine, 213–218°/15 mm.
Ethyl-γ-hydroxypropyl cresidine, 142–147°/6 mm.
Butyl-γ-hydroxypropyl cresidine, 159–164°/2 mm.
Methyl-γ-hydroxypropyl cresidine, 183–187°/18 mm.

It is, therefore, apparent that we have provided methods for the production of derivatives of cresidine having the general formula:

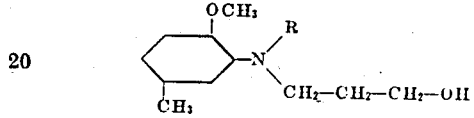

where R is a group selected from hydrogen, methyl, ethyl, propyl, butyl, hydroxyethyl, hydroxypropyl or glyceryl.

As indicated above, the azo dye compounds prepared in accordance with this invention utilize a derivative of cresidine wherein R is hydrogen.

The azo dye compounds of our invention are relatively insoluble in water. They may be employed for the direct dyeing of organic derivatives of cellulose, and particularly textile materials, by grinding to a fine powder, intimately mixing it with a suitable dispersing or solubilizing agent and adding the resulting mixture to water or a dilute solution of soap and water to form an aqueous dyebath. Following this known preparation of the dyebath, the textile material to be dyed may be added to the dyebath and the dyeing operation conducted in known fashion. For a more complete description as to how the azo dye compounds of our invention may be employed in dying or coloring operations reference may be had to our U. S. Letters Patents No. 2,115,030, issued April 26, 1938, wherein the dyeing of textile materials made of or containing an organic derivative of cellulose and more particularly cellulose acetate silk textile materials is described. It will be understood, however, that with the dye compounds of the present invention dyeing of excellent fastness to light and washing can be obtained with smaller concentrations of dye than specifically indicated in our said letters patent. Again, the dyeing operation may be conducted at a somewhat lower temperature than that indicated, for example, a temperature of 60–75° C. although the temperature specifically set forth in our said Letters Patent is equally satisfactory.

We claim:

1. The azo dye compounds having the general formula:

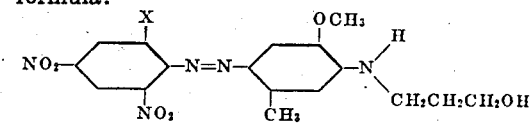

wherein X represents a halogen atom.

2. The azo dye compound having the formula:

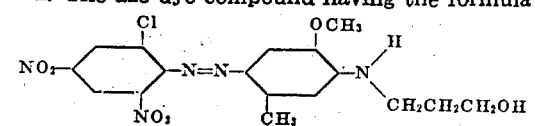

3. The azo dye compound having the formula:

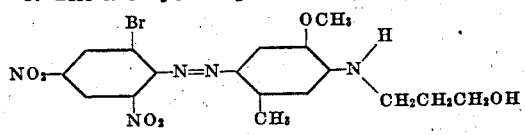

4. The process of coloring material made of or containing an organic derivative of cellulose which comprises applying thereto an azo dye compound having the general formula:

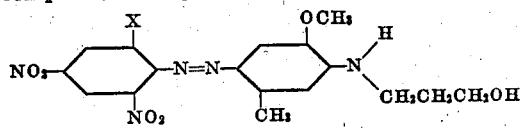

wherein X represents a halogen atom.

5. The process of coloring a cellulose acetate which comprises applying thereto an azo dye compound having the general formula:

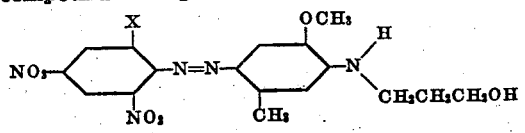

wherein X represents a halogen atom.

6. The process of coloring a cellulose acetate which comprises applying thereto the azo dye compound having the formula:

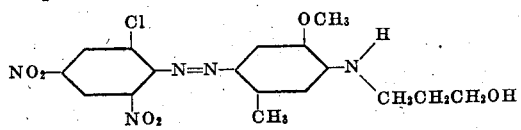

7. The process of coloring a cellulose acetate which comprises applying thereto the azo dye compound having the formula:

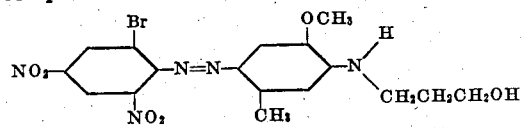

JAMES G. McNALLY.
JOSEPH B. DICKEY.